July 22, 1969  YU K. PEI  3,457,054
VACUUM FORMING GLASS ARTICLES WITH VENTED MODULES
Filed March 21, 1966  2 Sheets-Sheet 1

INVENTOR.
YU KUN PEI
BY
ATTORNEYS

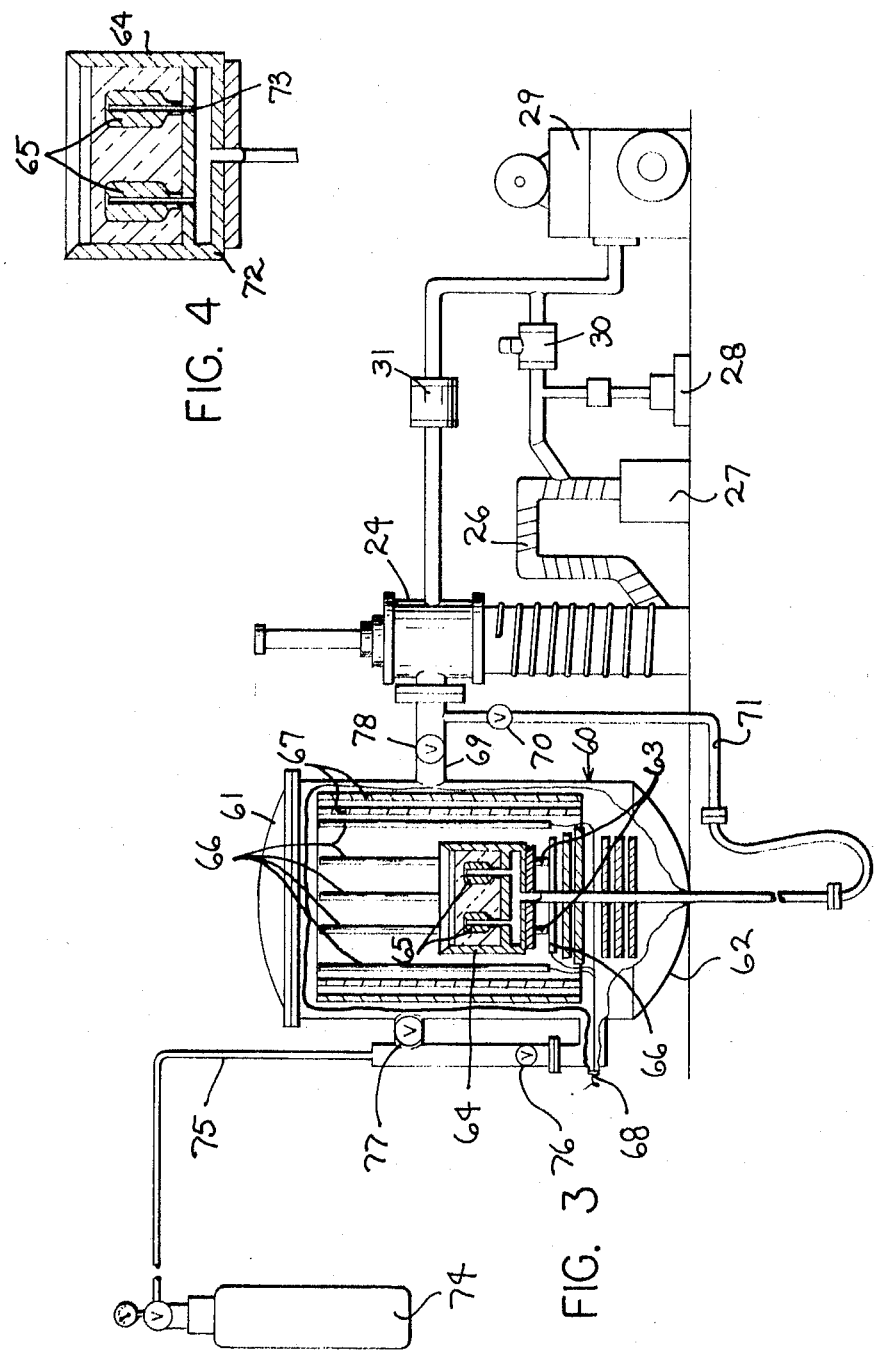

United States Patent Office 3,457,054
Patented July 22, 1969

3,457,054
VACUUM FORMING GLASS ARTICLES WITH VENTED MODULES
Yu K. Pei, Toledo, Ohio, assignor to Owens-Illinois, Inc., a corporation of Ohio
Filed Mar. 21, 1966, Ser. No. 535,859
Int. Cl. C03k 27/06; C03b 19/02
U.S. Cl. 65—18
2 Claims

ABSTRACT OF THE DISCLOSURE

Method for forming a hollow cavity glass article by heating a glass frit composition in a mold under reduced pressure and immersing porous modules into said molten glass while reducing interior pressure of the modules and subsequently moving the formed article and assembly into a high pressure inert atmosphere chamber for solidification and subsequent burning out the modules.

This invention relates to a method and apparatus for forming seed, cord and blister-free glass.

More specifically, this invention relates to a method and apparatus for forming glass articles by a vacuum casting technique wherein the glass articles formed are rendered free of any defects caused by non-homogeneity.

It has been the practice in the past to form relatively large glass objects such as mirror blanks by casting the glass in a mold by pouring molten glass within the preconditioned or pre-heated mold. In this system, it is necessary that the mold and the surrounding environment be maintained at a relatively high temperature, well above the liquidus temperature of the glass. This is particularly true since it is necessary to hold the glass at a temperature in the range of its normal fining temperature so as to ensure complete removal of seeds and cords. However, most glasses when held at this high a temperature for any length of time exhibit the unfortunate property of producing small bubbles or blisters from entrained and dissolved gases.

Furthermore, during the pouring of the glass into the molds, it is a problem to avoid entrapping air or other undesirable gases. In order to eliminate these gases which may be entrapped, it is necessary in many instances to heat the glass to a temperature where its viscosity is low enough so that the gas is evolved.

With the foregoing in view, it is an object of this invention to provide a method and apparatus for casting glass objects wherein all seeds, cords or blisters are eliminated from the article produced.

It is an additional object of this invention to provide a method and apparatus for forming glass articles wherein the melting and forming temperature is considerably lower than the normal fining temperature.

It is a further object of this invention to cast glass objects or articles at temperatures slightly above the liquidus temperature wherein there is no possibility of air entrapment.

It is a still further object of the present invention to provide a method of forming glass articles of intricate detail and exacting dimensional specifications while minimizing the possibility of the inclusion of seed or other entrapped gaseous defects.

An additional object of the present invention is to provide a method of forming seed and blister-free glass articles from viscous, high melting, glass compositions without utilizing the extreme fining temperature ordinarily required to fine such compositions.

Other and further objects will be apparent from the following description taken in conjunction with the annexed sheets of drawings, wherein:

FIG. 3 is a schematic elevational view, partly in section, of a second embodiment of the invention; and FIG. 4 is a detailed cross-sectional view of the mold and module structure utilized in the second embodiment.

Figure 2:
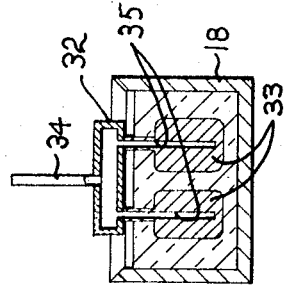
FIG. 2 is a detailed vertical cross-section view of the module structure and mold forming a part of the invention.

With reference to the drawings, a description of the apparatus of FIGS. 1 and 2 will be given.

A generally cylindrical furnace 10 having its upper end closed by a lid 11 is divided by a gate valve 12 into an upper chamber 13 and a lower chamber 14. As shown in FIG. 1, the two chambers 13 and 14 are separated by the gate valve 12, which is of the conventional type, in which a gate 15 is slidable to the right to provide an opening which, as will later be described, must be sufficiently large to permit passage therethrough of the glass articles and mold. When the gate 15 is in the position shown in FIG. 1, it effectively heat seals the two chambers so that a relatively high temperature may be maintained in the lower chamber 14, while the upper chamber may be maintained at a lower temperature.

The lower end of the furnace 10 is closed by a bottom wall 16 and connected to this wall within the chamber 14 is a mold supporting member 17 on which a mold 18 is adapted to rest. The mold 18 is formed of silica, graphite or other suitable inert material and its interior carries the external configuration of the article to be formed.

Within the chamber 14, in surrounding relationship with respect to the mold 18, are a plurality of generally cylindrical heat baffles 19. A plurality of vertically positioned molybdenum rods 20 are located in the space between the mold and baffles and are connected to a suitable source of electrical current by lead-in wires 21.

With this particular arrangement of heaters and baffles, it is possible to provide a temperature within the chamber 14 at any selected level up to 3,000° F. The upper chamber 13 is also provided with a resistance (schematically shown) heater 22 which may be formed of Nichrome. The heater 22 is provided with lead-in wires 23 which are connected to a suitable source of electrical power (not shown).

Opening into the side of the chamber 14 is a pipe 53 having its outer end connected to the inlet of a diffusion pump 24. A valve 25, whose function will be described later, is located in the pipe 53.

The diffusion pump 24 has its outlet 26 connected to a booster pump 27 which in turn is connected to a holding pump 28. As is well known, a diffusion pump backed up by a booster pump will effectively provide a fairly low vacuum system, it being understood that by this arrangement of apparatus the chamber 14 may be easily evacuated, for example to a medium vacuum of 27–28 inches of mercury.

In the event of failure of the booster pump and holding pump, a back-up pump 29 is connected by a valve 30 to the exhaust side of the diffusion pump or by way of a valve 31 to the inlet side of the diffusion pump.

As will later be described in detail, the mold 18 is filled with glass frit or cullet, of the composition desired, and placed on the mold support 17. With the diffusion pump and back-up pump operating, the chamber 14 will be evacuated of all air and the heaters 19 will be turned on so as to effectively fuse and melt the fritted glass within the mold 18. It is preferred to accomplish this fusing at temperatures at the liquidus or slightly above.

Simultaneous with this operation, the upper chamber 13 is heated and will also be evacuated since the valve 12 does not provide a pressure seal. The upper chamber contains a vacuum header 32 to which are connected a plurality of porous graphite modules 33. The header 32 is supported within the upper chamber by a pipe 34 which extends through the cover or lid 11 by way of suitable packing glands so as to prevent intrusion of air into the upper chamber.

As best shown in FIG. 2, the header 32 takes the form of a hollow chamber to which the graphite modules 33 are connected with the interior of the header 32 being connected to the interior of the graphite modules through the passages 35 extending thereinto.

As will later be described, the upper chamber 13 is heated to a temperature less than the lower chamber 14 so as to avoid heating of the graphite modules to a temperature higher than necessary. It is desirable that the graphite modules not be heated in the presence of an oxidizing atmosphere and with this in view, a circulating fan or pump 36 is connected, through the valve connecting means 37, to the interior of the chamber 13 and by a second valve 38 connected to the same chamber 13. In this manner the atmosphere within the chamber 13 may be circulated through the pump or fan 36. The fan or pump is also connected through the valved line 39 to a source 40 of inert gas, for example argon. The fan is included to ensure circulation of the inert gas and thereby prevents any thermal gradients in the chamber. In my experiments thus far I have discovered that vacuum alone in the upper chamber is sufficient to prevent oxidation.

The pump 36 is driven by a motor 41 connected thereto and by this arrangement the chamber 13 may be filled with an inert gas such as argon with the gate valve 12 closed while the chamber 14 may be evacuated.

After the glass in the mold 18 has been fused and melted and its temperature is such that the viscosity of the glass is approximately log 4, the gate 15 will be moved to the open position and the header 32, carrying the modules 33, is moved downwardly by the pipe 34 until the modules are immersed in the glass in the manner illustrated in FIG. 2. With the insertion of the modules in the glass, the valve 25 will be operated to shut off the vacuum connection to the chamber 14. At this time the vacuum, which is connected by line 42 to the pipe 34, will be on thus ensuring that any gases which might possibly be formed on the exterior of the modules will be drawn through the porous modules and be exhausted through diffusion pump 24. By opening a valve 43 which is in a line 44 connecting the chamber 14 with the chamber 13, argon gas is introduced into the system so as to raise the pressure within the chamber 14 to atmospheric pressure or higher if desired. With atmospheric pressure present in chamber 14, the upper surface of the molten glass within the mold 18 will be subjected to 14.7 lbs./in.$^2$ and in a sense this force will be exerted throughout the entire body of molten glass thus ensuring that the molten glass becomes intimately associated with the mold and the modules. No possible entrapment of air or other gas will then be possible. Also, the glass will be forced to move into extremely narrow crevices between the modules, whereas without the operation of atmospheric pressure on the glass surface, it would be difficult to ensure that the glass, which does not wet the graphite and which has a relatively high surface tension, would enter small crevices or passages formed between the modules or in an intricate mold configuration.

The heaters 20 are turned off to permit the glass to cool. When the glass has cooled to the extent that it is self-supporting, the pipe 34 is raised and the mold and glass are lifted thereby into the upper chamber 13. Once the mold has cleared the valve 15, the valve may be shut and the mold may then rest on the upper surface of the valve 15. Continued controlled cooling of the glass may then be carried out in the upper chamber 13 until the glass is cooled to a temperature of approximately 300° F., at which time the cover 11 may be removed and the glass taken from the furnace 10.

In the alternative, it is possible to provide the full annealing of the glass article while it is within the chamber 13 and by changing the connection to the pipe 34, it is possible to burn out the graphite modules 33 from the glass by introducing air into the pipe 34. This, of course, would be done when the glass is at a somewhat higher temperature, for example 1000–1100° F. At this temperature the glass has solidified to the extent that the combustion of the graphite will not seriously affect the surface properties of the glass.

From the above description it is apparent to those skilled in the art that I have discovered a novel method of forming seed and blister-free articles of intricate detail from high viscosity glasses without the ordinary problems associated with fining such high viscosity compositions. Additionally, this forming method provides for controlled annealing of the finished glass article. Another feature of the present invention resides in the fact that comparatively light weight glass objects result from the forming process because substantial voids remain within the interior of the body when the modules have been burned away.

In another embodiment of the present invention the modules may be supported by the mold. This embodiment is shown in FIGS. 3 and 4, wherein the modules extend within the interior of the mold. The module may be either an integral portion of the mold construction or it may be attached mechanically to the surface. The important features are that the module has a hollow interior and is equipped with a means of reducing the pressure within this interior section (i.e., a vacuum source). The module must also be of porous construction in that it will permit the passage of gas from the exterior surface to the interior surface under the influence of the reduced pressure.

With particular reference to FIGS. 3 and 4, the second embodiment of the apparatus will be described. Those elements of apparatus which are identical to those of the species of FIG. 1 have been given the same reference numerals.

A generally cylindrical furnace 60 has its upper end closed by a lid 61 and lower end closed by bottom wall 62. Connected to this wall within the chamber are mold supporting members 63 on which a mold 64 is adapted to rest. The mold 64 (as in the privously described embodiment) is formed of silica, graphite or other suitable inert material. Extending within the interior of the mold are porous graphite modules 65. In conjunction with the mold, these modules define the external configuration of the article to be formed.

Within the furnace 60 in surrounding relationship with respect to mold 64 are a plurality of molybdenum heating elements 66 and a plurality of cylindrical heat baffles 67. The molybdenum heating elements 66, which are in the form of rods, are connected to a suitable source of electrical current by lead-in wires 68.

With this particular arrangement of heaters and baffles, it is possible to provide a temperature within the furnace 60 at any selected level up to about 3000° F.

Opening into the side of furnace 60 is a pipe 69 having its outer end connected to the inlet of the diffusion pump 24. A valve 78 is located in the pipe 69.

The diffusion pump 24 has its outlet 26 connected to a booster pump 27 which in turn is connected to a holding pump 28. As is well known, a diffusion pump backed up by a booster will effectively provide a vacuum of 27–28 inches of mercury in the system shown.

In the event of failure of the booster pump and holding pump, a back-up pump 29 is connected by valve 30 to the exhaust side of the diffusion pump or by valve 31 to the inlet side of the diffusion pump.

As in the previous embodiment, the mold 64 is filled with a glass making material, such as a flass frit, of the composition desired and placed on the mold support 63. With the diffusion pump and back-up pump operating, the furnace 60 will be evacuated to a vacuum of about 27–28 inches of mercury and the heaters 66 will be turned on so as to effectively fuse and melt the fritted glass within the mold 64.

Simultaneous with this operation, a vacuum is drawn through the porous modules 65 by way of the open valve 70 in a vacuum line 71 connected to the pipe 69. The line 71 is suitably sealed at the point of entry into furnace 60 so as to prevent intrusion of air.

As best shown in FIG. 4, the mold 65 is formed with a header 72 which takes the form of a hollow chamber to which the interior of the graphite modules 65 are connected by passages 73 extending through the mold bottom and into the module.

A source 74 of inert gas is connected by a line 75 to the furnace 60. The flow of the inert gas can be regulated by valves 76 and 77.

After the glass in the mold 64 has been fused and melted and its temperature is such that the viscosity of the glass is approaching log 4, the valves 76 and 77 will be opened to admit the inert gas to raise the pressure in the furnace 60 and valve 78 is closed shut of the vacuum source. At this same time, the vacuum system which is connected to pipe 71 continues in operation to ensure that a pressure differential exists across the graphite modules. With atmospheric pressure present in the furnace 60, the upper surface of the molten glass within the mold 64 will be subject to 14.7 lbs./in.$^2$. This force will be exerted throughout the entire body of the molten glass, thus ensuring that the molten glass becomes intimately associated with the mold and modules. No entrapment of air or other gaseous material will then be possible. Also, the glass will be forced to move into any extremely narrow crevices between the modules, whereas without the operation of atmospheric pressure on the glass surface, it would be difficult to ensure that the glass which does not wet the graphite, would enter the small crevices or passages formed between the modules.

The heaters 66 are turned off to permit the glass to cool. When the glass is cooled to near the annealing range it can be removed to an annealing furnace (not shown) and annealed to the desired degree. Air may be introduced during the annealing process when the temperature is about 1000–1200° F. to burn away the graphite modules.

In the present invention it is necessary to use a desired glass composition in the form of a glass frit or particles. Methods of preparing glass frits are well known in the art and therefore no detailed description is included in this disclosure.

By utilizing fritted glass, the need for homogenizing or mixing is eliminated since a great amount of the water and other impurities present in the raw batch materials have already been expelled.

Figure 1:
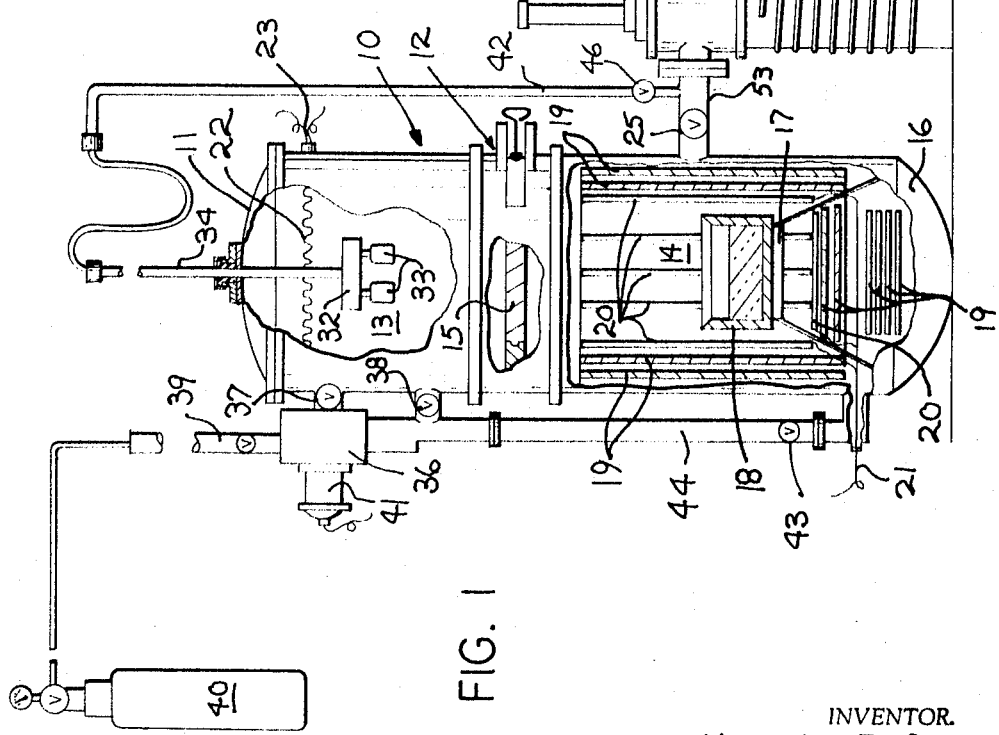
FIG. 1 is a schematic side elevational view, partly in section, of the apparatus of the invention.

The operation of the apparatus of FIGS. 1 and 2 and the method of forming carried out may be better understood by the following description of the operation of the device.

When the mold has been charged with the frit, the furnace is closed and sealed. The valves on the inert gas recirculation system are closed. The gate valve 12 is then closed separating the melting furnace into two chambers. The electrical heating elements in the lower section 14 are then actuated to raise the temperature of the glass composition being melted to slightly above the liquidus temperature. For a particular composition used in making certain types of glass articles the liquidus temperature was found to be about 2400° F. with the viscosity at about log 4.

During this heating period, the valve to the vacuum system is opened and vacuum equipment is actuated so as to draw a vacuum in the range of about 24–29 inches of mercury. Preferably the vacuum is 27–28 inches of mercury.

The molten glass in the lower chamber is then maintained at temperatures ranging from the liquidus temperature of the glass composition being used to about 50° F. above the liquidus while the vacuum is maintained at 27–28 inches of mercury. Under the influence of these conditions the glass in the mold is fused into a homogeneous and seed-free liquid mass. During this period, the rate of fining is observed to be unexpectedly enhanced. For example, in a high viscosity glass such as those used in making optical mirror blanks, the glass was observed to become seed-free and homogeneous at 2400° F. without recourse to any mechanical or thermal agitation. This is considerably lower than temperatures ordinarily required to fine such composition. Under ordinary conditions, temperatures of 2700–2800° F. would be required.

In practicing my invention, temperatures higher than about 120° F. above the log 4 viscosity temperatures should be avoided. At these temperatures the viscosity is reduced to the point where chemically dissolved gases will be released under the influence of the existing vacuum. In any event, these chemically dissolved gases will not cause the formation of defects such as seeds and blisters if they are allowed to remain permanently dissolved in solution.

While the glass is melting in the lower section, the heating elements in the upper section are actuated so as to heat the graphic modules to about 1000–1200° F. The modules are preheated to a lower temperature to minimize the opportunity for oxidation of the graphite. While the graphite modules are just as effective when they are preheated to higher temperatures, the resulting surface oxidation has a tendency to discolor the molten glass as will be understood from the following description. It is often desirable to bleed the inert gas into the upper chamber during this preheating to assure this surface oxidation does not occur.

In the preferred operation of the embodiment of FIGS. 1 and 2, a vacuum is also maintained in the upper chamber of the furnace during this preheating period. The gate valve 12 is not designed to form a vacuum seal even when in the closed position, consequently the entire furnace 10 is under vacuum. I have found that added benefit is derived if the vacuum line 42 to the header 32 is opened. This assures that the modules will remain free of the accumulation of surface impurities. It also assures that all undesirable gases are removed from the modules and thereby prevents surface oxidation of the graphite modules. I have found that the presence of surface oxidation on the modules tend to contaminate the molten glass as will be understood from the following description. If a high degree of purity is not required in the final glass article, maintenance of the vacuum through the module is of lesser importance.

When the glass in the mold has reached the log 4 viscosity temperature or slightly above, the gate valve 12 is opened and the modules are lowered into the mold. Since the vacuum was maintained in both chambers, there is no change in pressure within the system at this time. After the modules are immersed to the desired depth in the molten glass, the vacuum valve 25 is closed and the valves to admit the inert gas are opened so as to bring the entire furnace to atmospheric pressure or slightly above. The vacuum is maintained on the modules, however, and the molten glass is caused to flow into all areas of the mold configuration under the influence of the pressure differential, even though the glass may be quite viscous as compared to glasses at ordinary forming temperatures.

These conditions are maintained for a time sufficient to assure that forming is complete. My experience has shown that a few minutes is all that is required. The heaters in the lower section of the furnace are then turned off and the molten glass is allowed to solidify to the point where the glass and mold can be raised by raising the pipe 34. When the glass has solidified, the vacuum through the modules is turned off at valve 46. When extremely heavy articles are formed by this method, it may be necessary to raise the mold by a conventional lifting mechanism (not shown) entering from the bottom of the furnace.

When the glass and mold have been raised to the upper chamber, the gate valve is closed and the gate is used as a supporting platform for the mold. The glass article may then be annealed at the desired rate by proper control of the current to the heating elements. If desired, air may be introduced into the modules through pipe 34, during the annealing period at temperatures of about 1000–1200° F. This will result in the complete combustion of the graphite modules.

When the glass article has been slowly cooled to about 300° F. or below, it may be removed from the furnace and is ready for use or further processing.

The operation of the device and method performed in the use of the apparatus of FIGS. 3 and 4 is summarized as follows:

The mold 64, as shown in FIG. 3, is filled with a glass making material such as a glass frit of the composition desired and placed on the mold support 63. With the diffusion pump 24 and back-up pump operating, the furnace 60 will be turned on so as to effectively fuse and melt the fritted glass within the mold 64 by raising the furnace temperature to slightly above the liquidus temperature of the composition used. Simultaneous with this melting procedure the vacuum line 71 leading to the modules is opened and the pressure is reduced within the module interior. This increases the rate of fining by aiding in removing any gases present in the mold. The gases are removed from within the mass of glass through the modules and are also removed from the free surface of the glass mass as a result of the reduced pressure existing in the furnace 60.

In one particularly viscous glass composition used in making large optical mirror blanks, I found that it was necessary to maintain a temperature of only about 2400° F. when the vacuum was about 27–28 inches of mercury. This is only about 20° F. above the liquidus temperature of the composition, but nevertheless the glass refined rapidly even though the viscosity was about log 4.

After a few minutes under these conditions of temperature and pressure, the glass was observed to be free of seeds and other undissolved gases. The valve 78 is then closed and the inert gas (argon) is then introduced through valves 76 and 77 to increase the pressure in the furnace 60 to about atmospheric while the reduced pressure is maintained on the interior of the modules.

These conditions are maintained for a short time period to ensure that the pressure will cause the molten glass to flow into all of the intricate details of the mold.

When this has been accomplished, the glass is controllably cooled slowly to room temperature and is removed from the furnace.

Alternatively, the mold can be removed from the furnace while the temperature is above the annealing point for specialized heat treatment. During heat treatment, for example, the graphite modules may be burned away by introducing air into the interior through line 71 while the temperature is about 1000–1200° F. At this temperature the glass structure and properties will not be affected by the combustion reactions. The glass article may be then cooled to room temperature and is suitable for use.

I claim:

1. The method of forming a homogeneous glass article in a mold comprising the steps of loading the mold with a glass frit composition, placing the mold in a furnace, reducing the pressure within the furnace, heating the glass to the liquidus temperature of the glass composition, immersing porous modules into the molten glass while maintaining the temperature of the glass at the liquidus temperature, simultaneously reducing the pressure in the interior of the modules, increasing the pressure within the furnace by introducing an inert gas, slowly lowering the temperature of the glass in the mold, moving the mold and modules to another heat chamber without exposure to an oxidizing atmosphere, slowly cooling the mold and glass to a temperature of about 300° F. and removing the formed glass article.

2. The method as set forth in claim 1, wherein the modules are formed of graphite, the additional step of exposing the modules to air after cooling to below the annealing point, to burn out the modules.

References Cited

UNITED STATES PATENTS

| | | | |
|---|---|---|---|
| 2,045,716 | 6/1936 | McCavley | 65—93 XR |
| 3,277,535 | 10/1966 | Rupert | 18—44 |
| 2,924,851 | 2/1960 | Birckhead et al. | |
| 798,642 | 9/1905 | Wadsworth | 65—81 |
| 2,434,780 | 1/1948 | Wiss et al. | 65—24 XR |
| 2,930,098 | 3/1960 | Emeis | 65—18 XR |
| 3,103,428 | 9/1963 | Stello et al. | 65—32 XR |
| 3,261,676 | 7/1966 | Morelock | 65—33 XR |
| 3,298,811 | 1/1967 | Kurkjian et al. | 65—32 XR |

S. LEON BASHORE, Primary Examiner

FRANK W. MIGA, Assistant Examiner

U.S. Cl. X.R.

65—23, 24, 25, 32, 144, 156, 157, 169, 306